No. 724,780. PATENTED APR. 7, 1903.
E. M. BASSLER.
PNEUMATIC FEEDER.
APPLICATION FILED JULY 5, 1902.
NO MODEL.
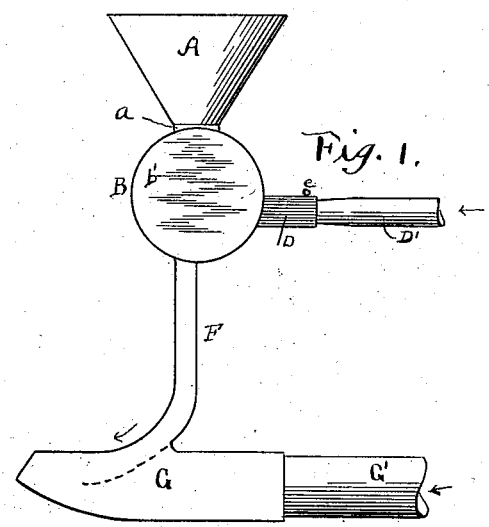
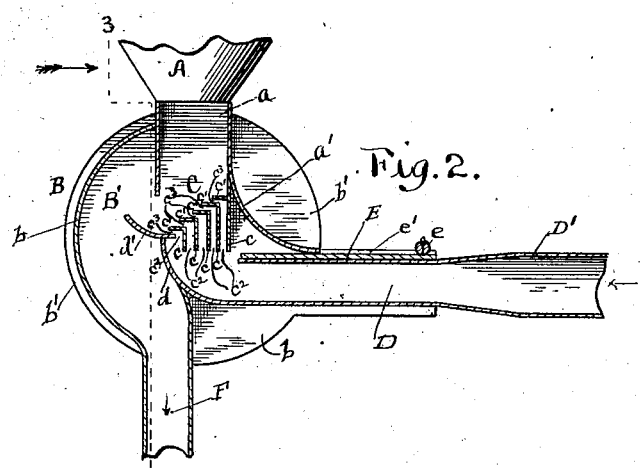
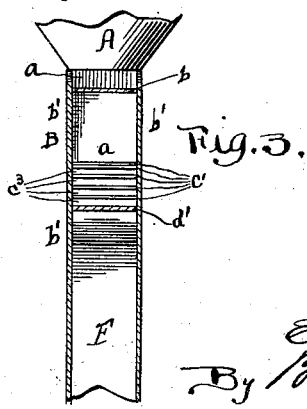
Witnesses.
Samuel W. Banning
Oscar W. Bond
Inventor.
Edwin M. Bassler
By Banning & Banning
Attys.

UNITED STATES PATENT OFFICE.

EDWIN M. BASSLER, OF CHICAGO, ILLINOIS, ASSIGNOR OF THREE-FOURTHS TO EUGENE WORTHING, CHARLES W. ROGERS, AND JULIAN W. MATHIS.

PNEUMATIC FEEDER.

SPECIFICATION forming part of Letters Patent No. 724,780, dated April 7, 1903.

Application filed July 5, 1902. Serial No. 114,416. (No model.)

*To all whom it may concern:*

Be it known that I, EDWIN M. BASSLER, a citizen of the United States, residing at Chicago, in the county of Cook and State of Illinois, have invented a certain new and useful Improvement in Pneumatic Feeders, of which the following is a specification.

This invention relates to a feeder for delivering granulated, powdered, or any light material or substance by the use of fluid-pressure, such as a blast from a fan or compressed air or other fluid under pressure, and has for its objects to construct a feeder simple in form and effective in operation and by the use of which the material acted on will be delivered in a separated condition instead of a mass under the action of the fluid-pressure employed, to regulate and control the fluid-pressure as may be required for use, to insure the discharge of the material for the action thereon of the fluid-pressure, so as to insure the delivery of the material in condition for use or further disposition, and to improve generally the construction and operation of the feeder as a whole.

The invention consists in the features of construction and combinations of parts hereinafter described and claimed.

In the drawings, Figure 1 is a side elevation of the apparatus or device constituting the feeder; Fig. 2, a sectional elevation of the parts shown in Fig. 1 with the hopper and delivery-tube broken off, and Fig. 3 a sectional edge elevation on line 3 of Fig. 2 looking in the direction of the arrow.

The feeder shown employs a hopper A, made of suitable material and of any desired shape or formation and having a discharging mouth or spout $a$, through which the material in the hopper is free to flow or pass. A receptacle B, formed of any suitable material and having a chamber B', into which the discharge mouth or spout of the hopper leads, is located below the hopper in the arrangement shown. This receiver, as shown, has its body formed of a semicircular wall $b$ on one side and end walls $b'$, and one wall of the spout $a$ has a continuation $a'$, united with the side walls $b'$ of the receiver. An injector C for the fluid-pressure, preferably air, either from a fan or a compressed-air reservoir or other source of supply, is located below the end of the mouth or discharge-spout $a$ and forward of the wall $a'$, and this injector consists of partitions or plates each having a vertical portion $c$ and a horizontal portion $c'$, spaced apart so as to leave vertical openings $c^2$ and horizontal openings $c^3$ between the partitions or plates, through which openings the air or other fluid-pressure medium is entered and projected from the openings $c^3$ into the chamber B', passing through an opening between the chamber and the mouth or spout $a$, through which opening the material is carried by the pressure or force of the air or other pressure medium into the chamber B' to be delivered therefrom.

A box or conduit D is located at the rear of the injector, and the bottom wall $d$ of this box or conduit is continued and has a curvature at its inner end for deflecting or turning upward the blast of air or other pressure medium for the air to pass through the openings $c^2$ and $c^3$, and joined to or supported on the curved end of the bottom wall or plate of the box or conduit is a plate or wall $d'$, which, as shown, has a slight curvature and forms the bottom of the opening between the spout of the hopper and the chamber B' for the material to rest thereon and be forced or carried into the chamber as it discharges from the spout. The box or conduit D has an extension or continuation D', which is to be connected with a source of pressure-supply (not shown) in any suitable manner for the pressure to pass into and through the box or conduit for projection at the injector. The amount of air or other pressure medium discharged by the injector is regulated by a slide or damper E, having a knob or handpiece $e$, by which the slide can be advanced or receded, as required, and, as shown, the slide is mounted in a suitable guideway $e'$ on the upper side of the top wall of the box or conduit D, so that its advance or forward end can be made to cover all or any desired number of the openings of the injector, as may be required for the amount of air or blast desired. The slide or damper E, as shown in Fig. 2, is wholly withdrawn, uncovering all of the openings of the injector, and in this condition the amount of air projected from the injector is equal in volume to the capacity of the supply-tube, giving the full supply for use. The damper can be advanced from the position shown in Fig. 1, so as to cover all but one of the openings of the injector, thus passing only a limited supply of air or other pressure medium, and it can be adjusted to uncover any number of openings in the injector between the first and the last of such openings. It will thus be seen that the amount of air or pressure used at the injector can be accurately and correctly regulated to suit the requirements of the blast for the feed of the material.

The material carried into the chamber B' descends therein and enters a delivery-spout F, in communication with the chamber, for delivering the material received into the chamber. The delivery-spout F, as shown, enters a discharge-nozzle G, attached to a blast-pipe G', by means of which the material can be carried or forced to any point desired or be discharged in a shower or spray direct from the nozzle, it being understood that the nozzle for delivery beyond its discharge end is entered into a carrying tube or conduit, (not shown,) or the nozzle itself may be extended so as to form a conveyer tube or conduit through which the material will be carried by the pressure of air or other pressure fluid or medium or by other carrier means.

The device or apparatus is simple in construction and at the same time will be found efficient and reliable for delivering powdered, granulated, or light material, such as powdered coal or granulated coal-dust, sand, shavings, and other like materials or substances. The amount of air employed can be positively and accurately controlled and regulated at the injector, thus enabling only the necessary amount of air needed to be used. The material as it descends from the hopper through the spout is caught by the blast of air and carried in a stream or shower through the opening into the receiving-chamber, thus preventing any clogging of the material in the spout or the entrance into the receiving-chamber. The force or pressure of the air in the chamber will carry the material projected thereinto out therefrom under a pressure that will insure its passage rapidly and without clogging through the delivery-spout, and for use in some places and for some purposes the air will be a benefit—as, for instance, in delivering powdered coal or coal-dust or shavings to a furnace.

The various advantages pertaining to the pneumatic feeder of this invention add to its utility, and the feeder will be of benefit in feeding light materials under conditions that will prevent any clogging or stopping of the feed between the hopper or receptacle containing the material and the point or place of discharge.

What I regard as new, and desire to secure by Letters Patent, is—

1. In a pneumatic feeder, the combination of a hopper or receptacle for the material to be fed, a receiving-chamber communicating with the hopper, and an injector for an air-blast interposed between the hopper and the receiving-chamber discharging into the latter and carrying the material thereinto, substantially as described.

2. In a pneumatic feeder, the combination of a hopper or receptacle for the material to be fed, a receiving-chamber into which the material is carried, an injector for an air-blast interposed between the hopper and the receiving-chamber discharging into the latter and carrying the material thereinto, a box or conduit for the blast, and a delivery-tube leading from the receiving-chamber, substantially as described.

3. In a pneumatic feeder, the combination of a hopper or receptacle for the material to be fed, a receiving-chamber into which the material is carried, an injector for an air-blast interposed between the hopper and the receiving-chamber discharging into the latter and carrying the material thereinto, a box or conduit for the blast, a cut-off for the injector, and a delivery-tube leading from the receiving-chamber, substantially as described.

4. In a pneumatic feeder, the combination of a hopper or receptacle for the material to be fed, a receiving-chamber into which the material is carried, an injector for an air-blast interposed between the hopper and the receiving-chamber, a box or conduit for the blast, a cut-off for the injector, a delivery-tube leading from the receiving-chamber, and a discharge-nozzle into which the delivery-tube leads, substantially as described.

5. In a pneumatic feeder, the combination of a hopper, a receiving-chamber for the material in communication with the hopper, and an injector discharging into the receiving-chamber to carry the material thereinto and interposed between the hopper and the receiving-chamber and consisting of a series of openings for the passage of the air-blast, substantially as described.

6. In a pneumatic feeder, the combination of a hopper, a receiving-chamber for the material in communication with the hopper, an injector discharging into the receiving-chamber to carry the material thereinto and interposed between the hopper and the receiving-chamber and consisting of a series of openings for the passage of the air-blast, and a box or conduit in communication with the openings of the injector, substantially as described.

7. In a pneumatic feeder, the combination of a hopper, a receiving-chamber for the material in communication with the hopper, an injector discharging into the receiving-chamber to carry the material thereinto and interposed between the hopper and the receiving-chamber and consisting of a series of openings for the passage of the air-blast, a box or conduit in communication with the openings of the injector, and a cut-off controlling the number of openings through which the blast passes, substantially as described.

8. In a pneumatic feeder, the combination of a hopper, a receiving-chamber for the material in communication with the hopper, an injector discharging into the receiving-chamber to carry the material thereinto and interposed between the hopper and the receiving-chamber and consisting of a series of openings for the passage of the air-blast, a box or conduit in communication with the openings of the injector, a cut-off controlling the number of openings through which the blast passes, and a delivery-spout leading from the receiving-chamber, substantially as described.

9. In a pneumatic feeder, the combination of a hopper, a receiving-chamber for the material in communication with the hopper, a curved plate or bottom at the opening between the receiving-chamber and the hopper, and an injector interposed between the hopper and the receiving-chamber and consisting of a series of openings for discharging air above the curved plate, substantially as described.

EDWIN M. BASSLER.

Witnesses:
OSCAR W. BOND,
WALKER BANNING.